United States Patent
Ruzicka

(10) Patent No.: US 12,480,481 B2
(45) Date of Patent: *Nov. 25, 2025

(54) SHAPE MEMORY ALLOY (SMA) BIMORPH ACTUATORS WITH REDUCED WIRE EXIT ANGLE

(71) Applicant: Hutchinson Technology Incorporated, Hutchinson, MN (US)

(72) Inventor: Ryan N. Ruzicka, Waconia, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,960

(22) Filed: Apr. 10, 2024

(65) Prior Publication Data

US 2024/0369047 A1    Nov. 7, 2024

Related U.S. Application Data

(63) Continuation of application No. 18/142,471, filed on May 2, 2023, now Pat. No. 11,982,263.

(51) Int. Cl.
*F03G 7/06*      (2006.01)
*G03B 5/00*      (2021.01)
*G03B 13/36*     (2021.01)

(52) U.S. Cl.
CPC ............ *F03G 7/06143* (2021.08); *G03B 5/00* (2013.01); *G03B 13/36* (2013.01); *G03B 2205/0007* (2013.01); *G03B 2205/0076* (2013.01)

(58) Field of Classification Search
CPC ....... F03G 7/06143; G03B 5/00; G03B 13/36; G03B 2205/0007; G03B 2205/0076
See application file for complete search history.

(56) References Cited

U.S. PATENT DOCUMENTS 5,588,295 A   12/1996  Brotz
6,367,252 B1   4/2002  Hill et al.
(Continued)

FOREIGN PATENT DOCUMENTS

CA   2018302 A1   11/1991
CN   1333178 A     1/2002
(Continued)

OTHER PUBLICATIONS

Beyer et al., "Resistance Welding of TiNi-Shape Memory Alloys", European Symposium on Martensitic Transformations (ESOMAT), pp. 199-206, 1989.
(Continued)

*Primary Examiner* — Hoang M Nguyen
(74) *Attorney, Agent, or Firm* — DLA Piper LLP (US)

(57) ABSTRACT

The present embodiments relate to a shape memory alloy (SMA) actuator with a joint between an SMA wire the SMA actuator being disposed at a bottom surface of the SMA actuator. The SMA actuator can include at least one fixed end configured to be fixed to a carriage, at least one free end, at least one beam connecting the fixed end and the free end, and at least one SMA wire. The at least one SMA wire can be electrically connected to the at least one fixed end and the at least one free end via electrical contact portions. The position of the at least one SMA wire being affixed to the bottom surface can allow for reduced stress and a wire exit angle at the weld joint between each SMA wire and the actuator, improving resiliency of the SMA actuator.

18 Claims, 9 Drawing Sheets

(56) References Cited

U.S. PATENT DOCUMENTS

| | | |
|---|---|---|
| 6,384,514 B1 | 5/2002 | Slutskiy et al. |
| 6,698,201 B1 | 3/2004 | Sarkar et al. |
| 7,256,518 B2 | 8/2007 | Gummin et al. |
| 7,349,236 B2 | 3/2008 | Lin et al. |
| 7,444,812 B2 | 11/2008 | Kirkpatirck et al. |
| 8,448,436 B2 | 5/2013 | Browne et al. |
| 8,607,619 B2 | 12/2013 | Djakov et al. |
| 8,707,694 B2 | 4/2014 | Olson et al. |
| 9,362,853 B2 | 6/2016 | Dehe |
| 9,581,147 B2 | 2/2017 | Flaschentrager et al. |
| 10,270,959 B1 | 4/2019 | Bart et al. |
| 10,427,934 B1 | 10/2019 | Coutu, Jr. et al. |
| 10,920,755 B2 | 2/2021 | Miller et al. |
| 11,105,319 B2 | 8/2021 | Miller et al. |
| 11,199,183 B2 | 12/2021 | Miller et al. |
| 11,306,706 B2 | 4/2022 | Ruzicka et al. |
| 11,333,134 B2 | 5/2022 | Miller et al. |
| 11,448,853 B2 | 9/2022 | Miller et al. |
| 11,668,288 B2 | 6/2023 | Ruzicka et al. |
| 11,686,294 B2 | 6/2023 | Miller et al. |
| 11,815,794 B2 | 11/2023 | Ruzicka et al. |
| 11,859,598 B2 | 1/2024 | Jelkin et al. |
| 11,867,160 B2 | 1/2024 | Miller et al. |
| 11,892,759 B2 | 2/2024 | Ruzicka et al. |
| 11,982,263 B1 * | 5/2024 | Ruzicka .............. F03G 7/06143 |
| 12,049,877 B2 | 7/2024 | Miller et al. |
| 12,055,844 B2 | 8/2024 | Ruzicka et al. |
| 2001/0002226 A1 | 5/2001 | Tanaka et al. |
| 2002/0057148 A1 | 5/2002 | Johnson et al. |
| 2004/0256920 A1 | 12/2004 | Gummin et al. |
| 2004/0261411 A1 | 12/2004 | MacGregor |
| 2005/0063038 A1 | 3/2005 | Filhol |
| 2006/0038643 A1 | 2/2006 | Xu et al. |
| 2006/0092514 A1 | 5/2006 | Koo et al. |
| 2007/0030573 A1 | 2/2007 | Batchko et al. |
| 2007/0090314 A1 | 4/2007 | Van Der Wijngaart et al. |
| 2007/0119165 A1 | 5/2007 | Yson et al. |
| 2007/0279497 A1 | 12/2007 | Wada et al. |
| 2007/0280668 A1 | 12/2007 | Kubo et al. |
| 2008/0198249 A1 | 8/2008 | Tanimura et al. |
| 2008/0247748 A1 | 10/2008 | Tanimura et al. |
| 2008/0259467 A1 | 10/2008 | Chung |
| 2008/0259470 A1 | 10/2008 | Chung |
| 2008/0287167 A1 | 11/2008 | Caine |
| 2009/0025501 A1 | 1/2009 | Mitteer |
| 2009/0097140 A1 | 4/2009 | Choi et al. |
| 2009/0159311 A1 | 6/2009 | Zheng et al. |
| 2009/0167108 A1 | 7/2009 | Yang |
| 2010/0027119 A1 | 2/2010 | Kollar et al. |
| 2010/0060776 A1 | 3/2010 | Topliss et al. |
| 2010/0074607 A1 | 3/2010 | Topliss et al. |
| 2010/0276492 A1 | 11/2010 | Wang et al. |
| 2011/0009979 A1 | 1/2011 | Shaw et al. |
| 2011/0026148 A1 | 2/2011 | Tanimura et al. |
| 2011/0063741 A1 | 3/2011 | Park et al. |
| 2011/0102920 A1 | 5/2011 | Shyu et al. |
| 2011/0103784 A1 | 5/2011 | Hashizume et al. |
| 2011/0107758 A1 | 5/2011 | Kotanagi et al. |
| 2011/0122201 A1 | 5/2011 | Silverbrook |
| 2011/0169920 A1 | 7/2011 | Ryu et al. |
| 2011/0179786 A1 | 7/2011 | Topliss et al. |
| 2011/0217031 A1 | 9/2011 | Eromaki |
| 2011/0249131 A1 | 10/2011 | Topliss et al. |
| 2011/0249336 A1 | 10/2011 | Sato |
| 2012/0019675 A1 | 1/2012 | Brown |
| 2012/0026387 A1 | 2/2012 | Kosaka et al. |
| 2012/0108980 A1 | 5/2012 | Shilling et al. |
| 2012/0174571 A1 | 7/2012 | Villanueva et al. |
| 2012/0249868 A1 | 10/2012 | Kamatani et al. |
| 2013/0002933 A1 | 1/2013 | Topliss et al. |
| 2013/0016419 A1 | 1/2013 | Morita et al. |
| 2014/0007571 A1 | 1/2014 | Jee |
| 2014/0028906 A1 | 1/2014 | Chen |
| 2014/0298794 A1 | 10/2014 | Flaschentrager et al. |
| 2014/0340575 A1 | 11/2014 | Kim |
| 2014/0355120 A1 | 12/2014 | Yeo |
| 2015/0090356 A1 | 4/2015 | Clingman et al. |
| 2015/0146312 A1 | 5/2015 | Gutierrez et al. |
| 2015/0289994 A1 | 10/2015 | Engeberg et al. |
| 2015/0304561 A1 | 10/2015 | Howarth et al. |
| 2015/0346507 A1 | 12/2015 | Howarth |
| 2016/0017870 A1 | 1/2016 | Mather |
| 2016/0187613 A1 | 6/2016 | Seo et al. |
| 2016/0201654 A1 | 7/2016 | Apdalhaliem et al. |
| 2016/0227088 A1 | 8/2016 | Brown et al. |
| 2017/0146769 A1 | 5/2017 | Huang et al. |
| 2017/0219443 A1 | 8/2017 | Davis et al. |
| 2017/0276122 A1 | 9/2017 | Van Den Aker |
| 2018/0025974 A1 | 1/2018 | Basker et al. |
| 2018/0033948 A1 | 2/2018 | Ee |
| 2018/0052381 A1 | 2/2018 | Koepfer |
| 2018/0120583 A1 | 5/2018 | Avivi et al. |
| 2018/0171991 A1 | 6/2018 | Miller et al. |
| 2019/0264664 A1 | 8/2019 | Zamani et al. |
| 2019/0285060 A1 | 9/2019 | Mirvakili et al. |
| 2020/0150443 A1 | 5/2020 | Ebert |
| 2021/0131405 A1 | 5/2021 | Miller et al. |
| 2022/0397103 A1 * | 12/2022 | Jelkin ..................... G02B 7/09 |
| 2023/0131889 A1 | 4/2023 | Sturm et al. |
| 2023/0248579 A1 | 8/2023 | Evans et al. |
| 2024/0036446 A1 | 2/2024 | Ruzicka et al. |
| 2024/0077782 A1 | 3/2024 | Miller et al. |
| 2024/0125306 A1 | 4/2024 | Miller |
| 2024/0184188 A1 | 6/2024 | Ruzicka et al. |
| 2024/0344505 A1 | 10/2024 | Ruzicka et al. |

FOREIGN PATENT DOCUMENTS

| | | |
|---|---|---|
| CN | 101896719 A | 11/2010 |
| CN | 101923633 A | 12/2010 |
| CN | 102055890 A | 5/2011 |
| CN | 102099939 A | 6/2011 |
| CN | 103168264 A | 6/2013 |
| CN | 103670980 A | 3/2014 |
| CN | 104364699 A | 2/2015 |
| CN | 105164413 A | 12/2015 |
| CN | 105487194 A | 4/2016 |
| CN | 107735712 A | 2/2018 |
| CN | 110709757 A | 1/2020 |
| CN | 112654786 A | 4/2021 |
| CN | 111396274 B | 5/2022 |
| EP | 1 243 793 A2 | 9/2002 |
| EP | 1 630 416 A1 | 3/2006 |
| EP | 2 262 095 A1 | 12/2010 |
| EP | 2 551 523 A1 | 1/2013 |
| GB | 2577203 A | 3/2020 |
| JP | 4-337222 A | 11/1992 |
| JP | 2000-137155 A | 5/2000 |
| JP | 2002-98911 A | 4/2002 |
| JP | 2009-251244 A | 10/2009 |
| JP | 2016-501338 A | 1/2016 |
| JP | 2019-28439 A | 2/2019 |
| KR | 10-2020-0003864 A | 1/2020 |
| TW | 201106039 A | 2/2011 |
| WO | WO 00/58980 A1 | 10/2000 |
| WO | WO 2009/072748 A1 | 6/2009 |
| WO | WO 2012/020212 A1 | 2/2012 |
| WO | WO 2016/189314 A1 | 12/2016 |
| WO | WO 2018/204888 A1 | 11/2018 |
| WO | WO 2020/205453 A1 | 10/2020 |

OTHER PUBLICATIONS

International Search Report and Written Opinion in International Application No. PCT/US2018/031256 dated Oct. 15, 2018.
International Preliminary Report on Patentability in International Application No. PCT/US2018/031256 dated Nov. 14, 2019.
Office Action in Chinese Patent Application No. 201880029763.5 dated Apr. 29, 2021.
Office Action in Chinese Patent Application No. 201880029763.5 dated Dec. 20, 2021.
Office Action in Chinese Patent Application No. 201880029763.5 dated May 20, 2022.

(56) References Cited

OTHER PUBLICATIONS

Notice of Granting Patent Right for Invention in Chinese Patent Application No. 201880029763.5 dated Aug. 23, 2022.
Examination Report in United Kingdom Application No. 1917208.9 dated Aug. 13, 2021.
Examination Report in United Kingdom Application No. 1917208.9 dated Oct. 22, 2021.
Examination Report in United Kingdom Application No. 1917208.9 dated Mar. 8, 2022.
Search Report in United Kingdom Application No. 1917208.9 dated Mar. 30, 2022.
Notice of Preliminary Rejection in Korean Application No. 10-2019-7035566 dated Jan. 4, 2023.
Notice of Allowance in Korean Application No. 10-2019-7035566 dated Jul. 1, 2023.
Combined Search and Examination Report in United Kingdom Application No. 2206304.4 dated May 17, 2022.
International Search Report and Written Opinion in International Application No. PCT/US2020/025065 dated Jun. 23, 2020.
International Preliminary Report on Patentability in International Application No. PCT/US2020/025065 dated Oct. 14, 2021.
Office Action in Chinese Patent Application No. 202080004847.0 dated Jul. 1, 2022.
Office Action in Chinese Patent Application No. 202080004847.0 dated Jan. 28, 2023.
Examination Report in United Kingdom Application No. 2113598.3 dated Jun. 23, 2022.
Notice of Reasons for Rejection in Japanese Patent Application No. 2021-557623 dated Dec. 5, 2023.
Notice of Reasons for Rejection in Japanese Patent Application No. 2021-557623 dated Jul. 2, 2024.
Office Action in Taiwan Patent Application No. 109110412 dated Sep. 11, 2023.
Decision of Rejection in Taiwan Patent Application No. 109110412 dated Mar. 13, 2024.
International Search Report and Written Opinion in International Application No. PCT/US2021/037947 dated Sep. 23, 2021.
International Preliminary Report on Patentability in International Application No. PCT/US2021/037947 dated Jan. 5, 2023.
Examination Report in United Kingdom Application No. 2219080.5 dated Dec. 12, 2023.
International Search Report and Written Opinion in International Application No. PCT/US2021/036211 dated Sep. 8, 2021.
International Preliminary Report on Patentability in International Application No. PCT/US2021/036211 dated Dec. 22, 2022.
Examination Report in United Kingdom Application No. 2218440.2 dated Nov. 29, 2023.
Combined Search and Examination Report in United Kingdom Application No. 2114527.1 dated Mar. 9, 2022.
Office Action in Chinese Utility Model Application No. 202121424905.3 dated Oct. 27, 2021.
International Search Report and Written Opinion in International Application No. PCT/US2022/017100 dated Jun. 2, 2022.
International Preliminary Report on Patentability in International Application No. PCT/US2022/017100 dated Aug. 31, 2023.
Office Action in Chinese Patent Application No. 202111072217.X dated Dec. 1, 2022.
Office Action in Chinese Utility Model Application No. 202222023197.3 dated Oct. 11, 2022.
International Search Report and Written Opinion in International Application No. PCT/US2022/032259 dated Sep. 22, 2022.
International Preliminary Report on Patentability in International Application No. PCT/US2022/032259 dated Dec. 21, 2023.
Office Action in Chinese Patent Application No. 202111072378.9 dated Dec. 1, 2022.
Office Action in Chinese Patent Application No. 202111072378.9 dated Apr. 28, 2023.
International Search Report and Written Opinion in International Application No. PCT/US2023/035154 dated Mar. 22, 2024.
Office Action in U.S. Appl. No. 15/971,995 dated Aug. 22, 2019.
Office Action in U.S. Appl. No. 15/971,995 dated Nov. 20, 2019.
Office Action in U.S. Appl. No. 15/971,995 dated Apr. 28, 2020.
Notice of Allowance in U.S. Appl. No. 15/971,995 dated Sep. 30, 2020.
Office Action in U.S. Appl. No. 17/146,213 dated Nov. 22, 2023.
Office Action in U.S. Appl. No. 17/146,213 dated Mar. 19, 2024.
Office Action in U.S. Appl. No. 17/146,213 dated Jul. 25, 2024.
Office Action in U.S. Appl. No. 16/775,207 dated Jun. 5, 2020.
Office Action in U.S. Appl. No. 16/775,207 dated Jun. 9, 2020.
Office Action in U.S. Appl. No. 16/775,207 dated Sep. 30, 2020.
Office Action in U.S. Appl. No. 16/775,207 dated Jan. 11, 2021.
Notice of Allowance in U.S. Appl. No. 16/775,207 dated Apr. 28, 2021.
Office Action in U.S. Appl. No. 17/412,030 dated Sep. 21, 2023.
Office Action in U.S. Appl. No. 17/412,030 dated Dec. 22, 2023.
Notice of Allowance in U.S. Appl. No. 17/412,030 dated Apr. 9, 2024.
Office Action in U.S. Appl. No. 16/859,929 dated Jun. 9, 2020.
Office Action in U.S. Appl. No. 16/859,929 dated Sep. 24, 2020.
Office Action in U.S. Appl. No. 16/859,929 dated Apr. 16, 2021.
Notice of Allowance in U.S. Appl. No. 16/859,929 dated Aug. 3, 2021.
Office Action in U.S. Appl. No. 17/549,348 dated Oct. 28, 2022.
Office Action in U.S. Appl. No. 17/549,348 dated Apr. 14, 2023.
Notice of Allowance in U.S. Appl. No. 17/549,348 dated Aug. 23, 2023.
Office Action in U.S. Appl. No. 17/195,497 dated May 17, 2021.
Office Action in U.S. Appl. No. 17/195,497 dated Sep. 8, 2021.
Notice of Allowance in U.S. Appl. No. 17/195,497 dated Dec. 14, 2021.
Office Action in U.S. Appl. No. 17/339,797 dated Nov. 17, 2021.
Office Action in U.S. Appl. No. 17/339,797 dated Mar. 7, 2022.
Notice of Allowance in U.S. Appl. No. 17/339,797 dated May 16, 2022.
Notice of Allowance in U.S. Appl. No. 17/714,069 dated Jan. 24, 2023.
Office Action in U.S. Appl. No. 17/207,530 dated May 27, 2021.
Office Action in U.S. Appl. No. 17/207,530 dated Sep. 8, 2021.
Notice of Allowance in U.S. Appl. No. 17/207,530 dated Jan. 18, 2022.
Office Action in U.S. Appl. No. 17/729,877 dated Oct. 13, 2022.
Notice of Allowance in U.S. Appl. No. 17/729,877 dated Feb. 14, 2023.
Office Action in U.S. Appl. No. 17/569,268 dated Jan. 27, 2023.
Office Action in U.S. Appl. No. 17/569,268 dated May 25, 2023.
Notice of Allowance in U.S. Appl. No. 17/569,268 dated Aug. 1, 2023.
Office Action in U.S. Appl. No. 18/103,725 dated Jun. 14, 2023.
Office Action in U.S. Appl. No. 18/103,725 dated Oct. 4, 2023.
Office Action in U.S. Appl. No. 18/103,725 dated Jan. 19, 2024.
Notice of Allowance in U.S. Appl. No. 18/103,725 dated Apr. 24, 2024.
Office Action in U.S. Appl. No. 18/103,745 dated Jun. 14, 2023.
Notice of Allowance in U.S. Appl. No. 18/103,745 dated Sep. 22, 2023.
Office Action in U.S. Appl. No. 18/379,105 dated Apr. 22, 2024.
Office Action in U.S. Appl. No. 17/831,318 dated Apr. 20, 2023.
Notice of Allowance in U.S. Appl. No. 17/831,318 dated Aug. 14, 2023.
Office Action in U.S. Appl. No. 18/142,471 dated Sep. 19, 2023.
Notice of Allowance in U.S. Appl. No. 18/142,471 dated Jan. 18, 2024.
International Search Report and Written Opinion in International Application No. PCT/US2024/022084 dated Aug. 7, 2024.
Combined Search and Examination Report in United Kingdom Application No. 2406075.8 dated Sep. 17, 2024.
Office Action in U.S. Appl. No. 18/379,105 dated Aug. 14, 2024.
Office Action in U.S. Appl. No. 18/407,667 dated Aug. 9, 2024.
Notice of Allowance in Japanese Patent Application No. 2021-557623 dated Nov. 5, 2024.
Office Action in U.S. Appl. No. 17/146,213 dated Oct. 29, 2024.
Notice of Allowance in U.S. Appl. No. 18/379,105 dated Nov. 6, 2024.

(56) References Cited

OTHER PUBLICATIONS

Office Action in U.S. Appl. No. 18/407,667 dated Jan. 10, 2025.

* cited by examiner

SHAPE MEMORY ALLOY (SMA) BIMORPH ACTUATORS WITH REDUCED WIRE EXIT ANGLE

CROSS-REFERENCE TO RELATED APPLICATIONS

This application is a continuation of U.S. application Ser. No. 18/142,471, filed May 2, 2023, the entire disclosure of which is hereby incorporated by reference.

TECHNICAL FIELD

Embodiments of the invention relate to the field of shape memory alloy systems. More particularly, embodiments of the invention relate to the field of shape memory alloy actuators and methods related thereto.

BACKGROUND

Shape memory alloy ("SMA") systems can include an actuator or structure that can be used in conjunction with various components, such as a camera lens element as an auto-focusing drive or an optical image stabilization (OIS) drive. The SMA actuator can be configured to actuate responsive to providing an electrical current to the SMA wire.

For example, a first end of an SMA wire can be engaged at a fixed end fixed to an actuator. Further, a second end of the SMA wire can be engaged to a free end configured to move in response to the actuation of the SMA wire. For instance, the free end can move in a z-direction in response to the actuation of the SMA wire.

SUMMARY

The present embodiments relate to a shape memory alloy (SMA) actuator with SMA wires affixed to a bottom surface of the SMA actuator for increased resiliency of the SMA actuator.

In a first example embodiment, a shape memory alloy (SMA) actuator is provided. The SMA actuator can include at least one fixed end configured to be fixed to a carriage and at least one free end. The SMA actuator can also include at least one beam connecting the fixed end and the free end.

The SMA actuator can also include at least one SMA wires. The at least one SMA wire can be electrically connected to the at least one fixed end and the at least one free end via electrical contact portions. The at least one SMA wire can be disposed to corresponding electrical contact portions at a bottom surface comprising a surface directed at the carriage.

In some instances, the electrical contact portions comprise a first set of electrical contact portions at the at least one fixed end. A first end of each of the at least one SMA wire can be disposed at each of the first set of electrical contact portions. The electrical contact portions can also include a second set of electrical contact portions at the at least one free end. A second end of each of the at least one SMA wire can be disposed at each of the second set of electrical contact portions.

In some embodiments, the SMA actuator can include a first fixed end with a first electrical contact portion connected to a first end of a first SMA wire, a first free end with a second electrical contact portion connected to a second end of the first SMA wire, and a first beam disposed between the first fixed end and first free end.

The SMA actuator can include a second fixed end with a third electrical contact portion connected to a second end of a second SMA wire, a second free end with a fourth electrical contact portion connected to a second end of the second SMA wire, and a second beam disposed between the second fixed end and second free end. The first free end can be directed in a direction opposing a direction of the second free end.

In some instances, responsive to obtaining an electrical current at the at least one SMA wire, the at least one free end is configured to move in a positive z-direction. Further, the actuator can include a wire exit angle comprising an angle between the at least one fixed end and the at least one SMA wire being less than 10 degrees upon actuation of each of the at least one SMA wire.

In some instances, the SMA actuator can be part of an autofocus system or an optical image stabilization system for a camera.

In another example embodiment, a device is provided. The device can include a carriage and an actuator engaged to the carriage. The actuator can include a fixed end fixed to the carriage, a free end, a beam connecting the fixed end and the free end, and at least one shape memory alloy (SMA) wire. The at least one SMA wire can be electrically connected to the fixed end and the free end via electrical contact portions. The at least one SMA wire can be disposed to the electrical contact portions at a bottom surface of the electrical contact portions directed at the carriage.

In some instances, the electrical contact portions comprise a first set of electrical contact portions at the at least one fixed end. A first end of the at least one SMA wire can be disposed at the first set of electrical contact portions. The electrical contact portions can also include a second set of electrical contact portions at the at least one free end. A second end of the at least one SMA wire can be disposed at the second set of electrical contact portions.

In some instances, the actuator can include a first fixed end with a first electrical contact portion connected to a first end of a first SMA wire, a first free end with a second electrical contact portion connected to a second end of the first SMA wire, and a first beam disposed between the first fixed end and first free end. In some instances, the actuator can include a second fixed end with a third electrical contact portion connected to a second end of a second SMA wire, a second free end with a fourth electrical contact portion connected to a second end of the second SMA wire, and a second beam disposed between the second fixed end and second free end. In some instances, the first free end is directed in a direction opposing a direction of the second free end.

In some instances, a wire exit angle comprising an angle between the fixed end and the at least one SMA wire or an angle between the free end and the at least one SMA wire is less than 5 degrees upon actuation of the at least one SMA wire.

In another example embodiment, a system is provided. The system can include a first actuator portion. The first actuator portion can include a first fixed end, a first free end, and a first SMA wire. The first SMA wire can include a first end welded to a bottom surface at the first fixed end and a second end welded to the bottom surface at the first free end. The system can also include a second actuator portion. The second actuator portion can include a second fixed end, a second free end, and a second SMA wire. The second SMA wire can comprise a first end welded to the bottom surface at the second fixed end and a second end welded to the bottom surface at the second free end.

In some instances, the system can include a carriage. The first fixed end and the second fixed end can be fixed to the carriage. Further, the bottom surface can comprise a surface directed toward the carriage.

In some instances, a direction of the first actuator portion opposes a direction of the second actuator portion. In some instances, any of the first free end and the second free end are configured to move in a positive z-direction. In some instances, the system is part of an autofocus system or an optical image stabilization system. In some instances, a wire exit angle comprising an angle between the first fixed end and the first SMA wire or an angle between the first free end and the first SMA wire is less than 10 degrees upon actuation of each of the first SMA wire.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

The present embodiments relate to shape memory alloy (SMA) actuators. SMA actuators as described herein can include a compact footprint and provide a high actuation height, for example movement in the positive z-axis direction (z-direction), referred to herein as z-stroke movement. The SMA actuator as described herein can include an SMA bimorph actuator. The SMA actuator may be used in many applications including, but not limited to, a lens assembly as an autofocus actuator, a micro-fluidic pump, a sensor shift, optical image stabilization, optical zoom assembly, to mechanically strike two surfaces to create vibration sensations typically found in haptic feedback sensors and devices, and other systems where an actuator is used. For example, embodiments of an actuator described herein could be used as a haptic feedback actuator for use in cellphones or wearable devices configured to provide the user an alarm, notification, alert, touched area or pressed button response. Further, more than one SMA actuator could be used in a system to achieve a larger stroke.

In some embodiments, the SMA actuator can include a z-stroke that is greater than 0.4 millimeters. Further, the SMA actuator for various embodiments can have a height in the z-direction of 2.2 millimeters or less, when the SMA actuator is in its initial, a de-actuated position. Various embodiments of the SMA actuator can be configured as an autofocus actuator in a lens assembly may have a footprint as small as 3 millimeters greater than the lens inner diameter. According to various embodiments, the SMA actuator may have a footprint that is wider in one direction to accommodate components including, but not limited to, sensors, wires, traces, and connectors. According to some embodiments, the footprint of an SMA actuator is 0.5 millimeters greater in one direction, for example the length of the SMA actuator is 0.5 millimeters greater than the width.

Figure 1:
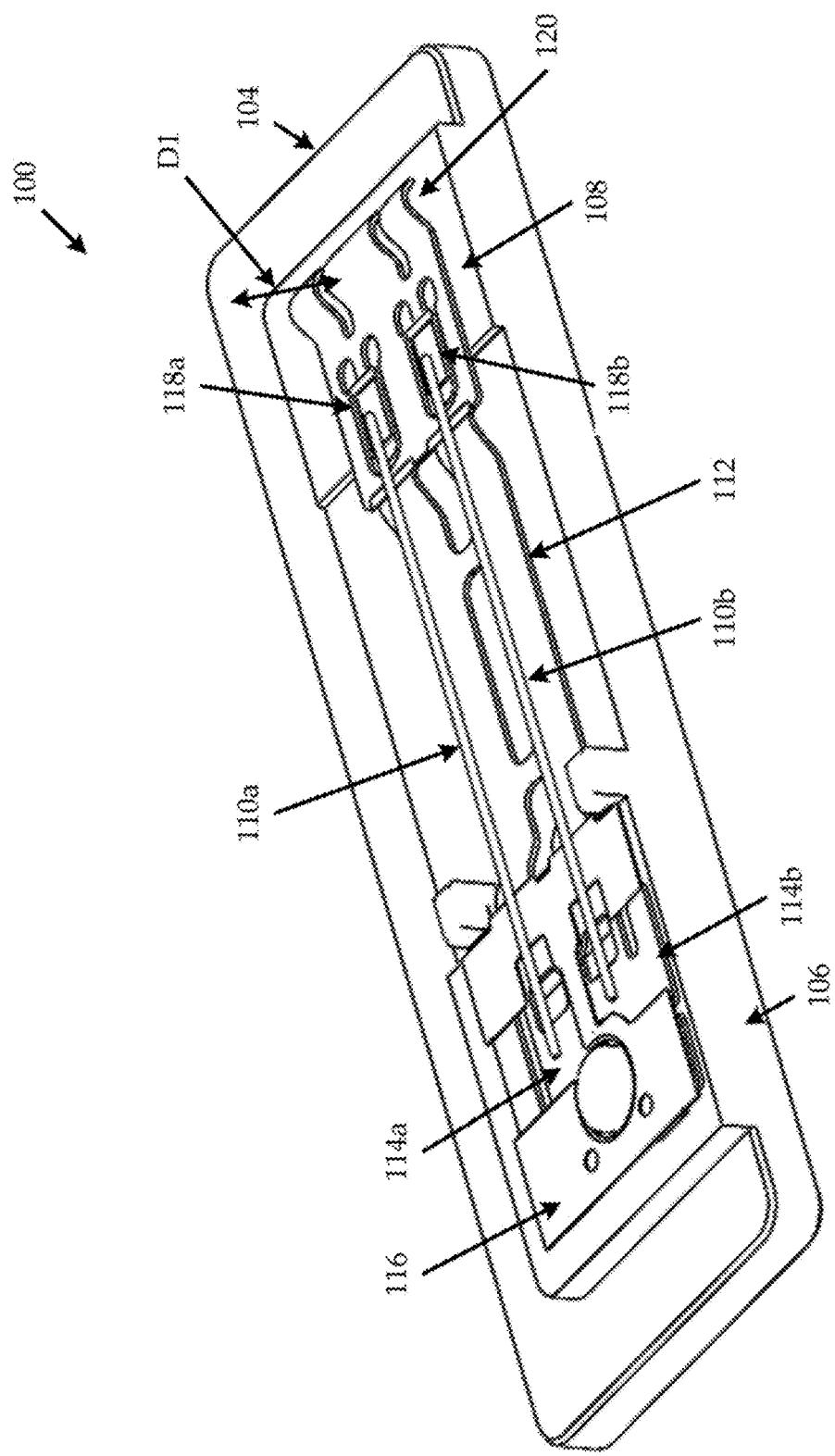
FIG. 1 illustrates an example prior art SMA bimorph actuator according to an embodiment.

FIG. 1 illustrates an example prior art SMA bimorph actuator 100 according to some embodiments. As shown in FIG. 1, in many cases, the actuator 100 can include a carriage 104. In many instances, the actuator can be affixed to the carriage 104 as described herein. The carriage 104 can increase resiliency of the actuator 100 by providing support for the actuator.

The actuator 100 can include a fixed end 106 and a free end 108. The fixed end 106 can be fixed to the carriage 104, while the free end 108 can include a load point 120 and can be detached from the carriage 104. As described in greater detail below, the free end 108 can move in a z-stroke direction (e.g., direction D1) responsive to providing an electrical current to SMA wires 110a, 110b.

As shown in FIG. 1, SMA wires 110a, 110b can extend from the fixed end 106 to the free end 108 of the actuator 100. Further, a beam 112 can be disposed below the SMA wires 110a, 110b and can connect the fixed end 106 and free end 108. The SMA wires 110a, 110b can connect to the actuator 100 at each end via electrical contacts. For example, at a first end of each SMA wires 110a, 110b, the SMA wires 110a, 110b can connect to the fixed end 106 at electrical contacts 114a, 114b. Further, at a second end (e.g., at the free end 108), the SMA wires 110a, 110b can connect to the free end 108 at electrical contacts 118a, 118b (e.g., via a welding or soldering process).

The actuator 100 can consist of a material such as steel or stainless steel, for example. Further, electrical contacts 114a-b, 118a-b can include a material allowing for receiving a welding or soldering joint, such as a gold-plated stainless steel, for example. Further, at free end 106, a dielectric 116 can isolate the electrical contacts 114a-b to prevent electrical current between the contacts. Dielectric 116 can include insulative materials, such as a Polyimide, for example. In some embodiments, a dielectric can be disposed between SMA wires 110a-110b and beam 112 at the free end 108 to electrically isolate the SMA wires 110a-b from the beam 112.

In some instances, the actuator can include a three-layer design, with a first layer comprising stainless steel (e.g., forming actuator 100), a second layer comprising a polyimide (e.g., isolating electrical contacts, and a third layer comprising gold-plated stainless steel.

For instance, in the actuator 100 as shown in FIG. 1, the SMA 110a-b can be engaged (e.g., at 114a-b, 118a-b) at a top or upper surface of the actuator (e.g., a surface facing away from the carriage 104). The SMA can be welded (or soldered) to a top stainless-steel surface (or, in some cases, a gold-plated metal). However, as described in greater detail below, such a configuration can result in lower resiliency of the weld joint due at least to the wire angle and maximum stress occurring at the weld joint as the SMA actuates.

Figure 2:
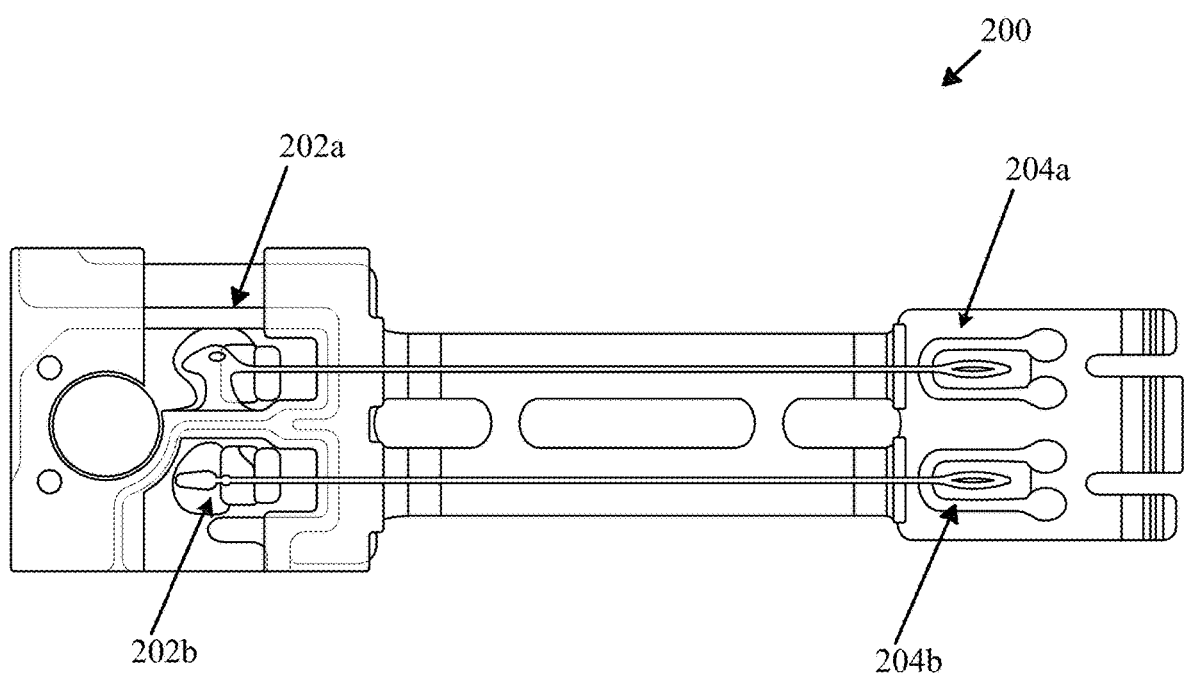
FIG. 2 illustrates an example actuator with an adhesive applied according to an embodiment.

In some instances, to increase resiliency of the weld joint disposed at a top surface of the actuator, an adhesive application process can be performed. An adhesive application process can include applying an adhesive to the weld joint. Further, the process can include an oven heating process to cure the adhesive. FIG. 2 illustrates an example actuator 200 with an adhesive applied. For example, an adhesive can be applied at weld joints 202a-b, 204a-b. However, an adhesive application process as described herein can include multiple steps, which can be resource and time intensive.

The present embodiments relate to SMA actuators (e.g., a bimorph actuator) with weld joints between the SMA and an actuator being at a lower or bottom surface of the actuator. Affixing the SMA wire at a bottom surface of the actuator can allow for a reduced wire exit angle and lower stress at the weld joints between SMA wire and the actuator.

Figure 3:
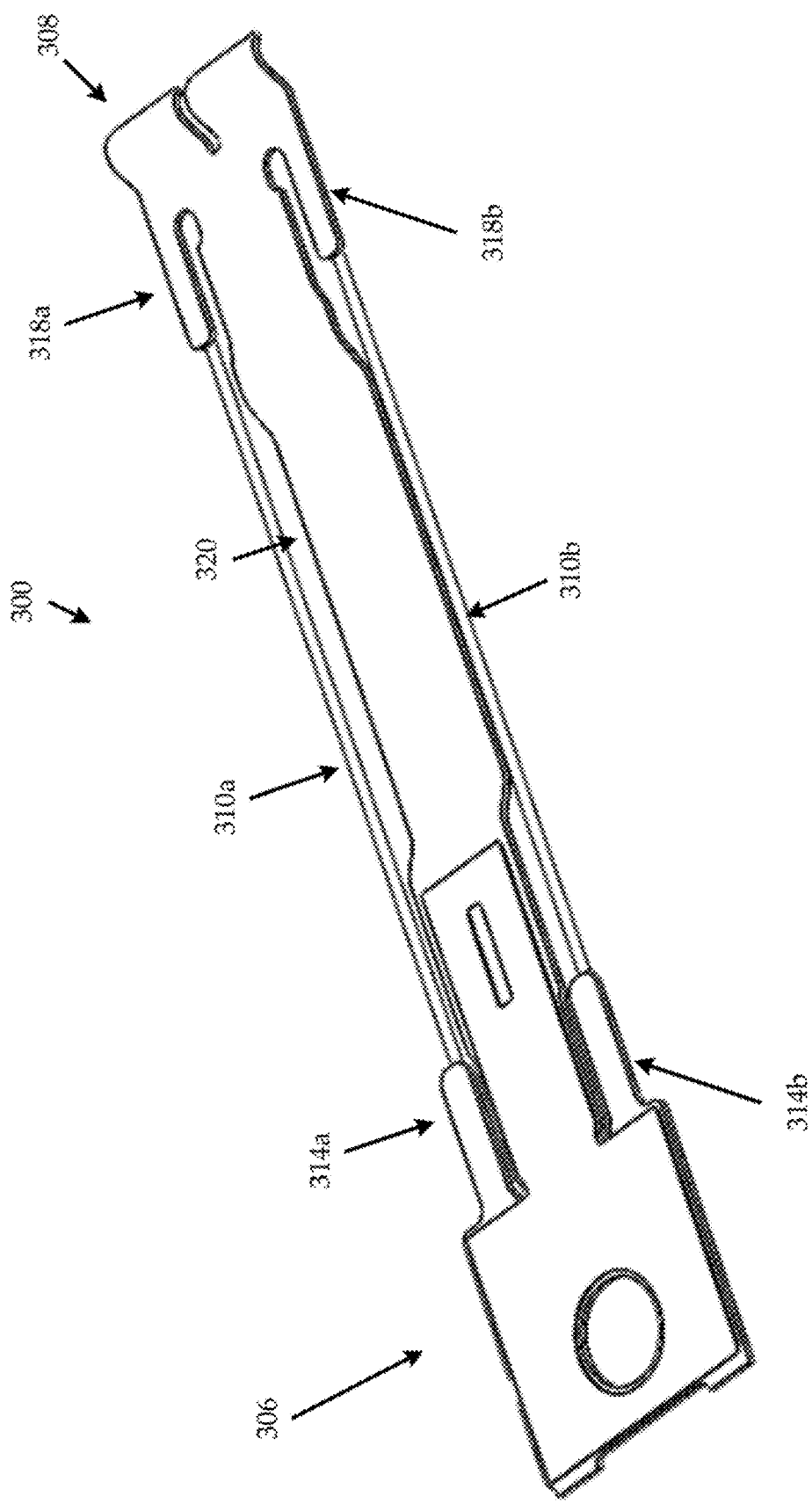
FIG. 3 illustrates a first example SMA actuator according to an embodiment.

FIG. 3 illustrates a first example SMA actuator 300. As shown in FIG. 3, the SMA wires 310a-b can be connected to the actuator at both a fixed end 306 and a free end 308. The actuator can include weld tongues to facilitate engaging the SMA wire to the actuator. For example, at the fixed end 306, a first set of weld tongues 314a-b can include the weld joint to a first end of the SMA wires 310a-b. Similarly, at the free end 308, a second set of weld tongues 318a-b can include the weld joint to a second end of the SMA wires 310a-b. The weld joints can be at a bottom surface (e.g., a surface facing a carriage) of the actuator.

Figure 4:
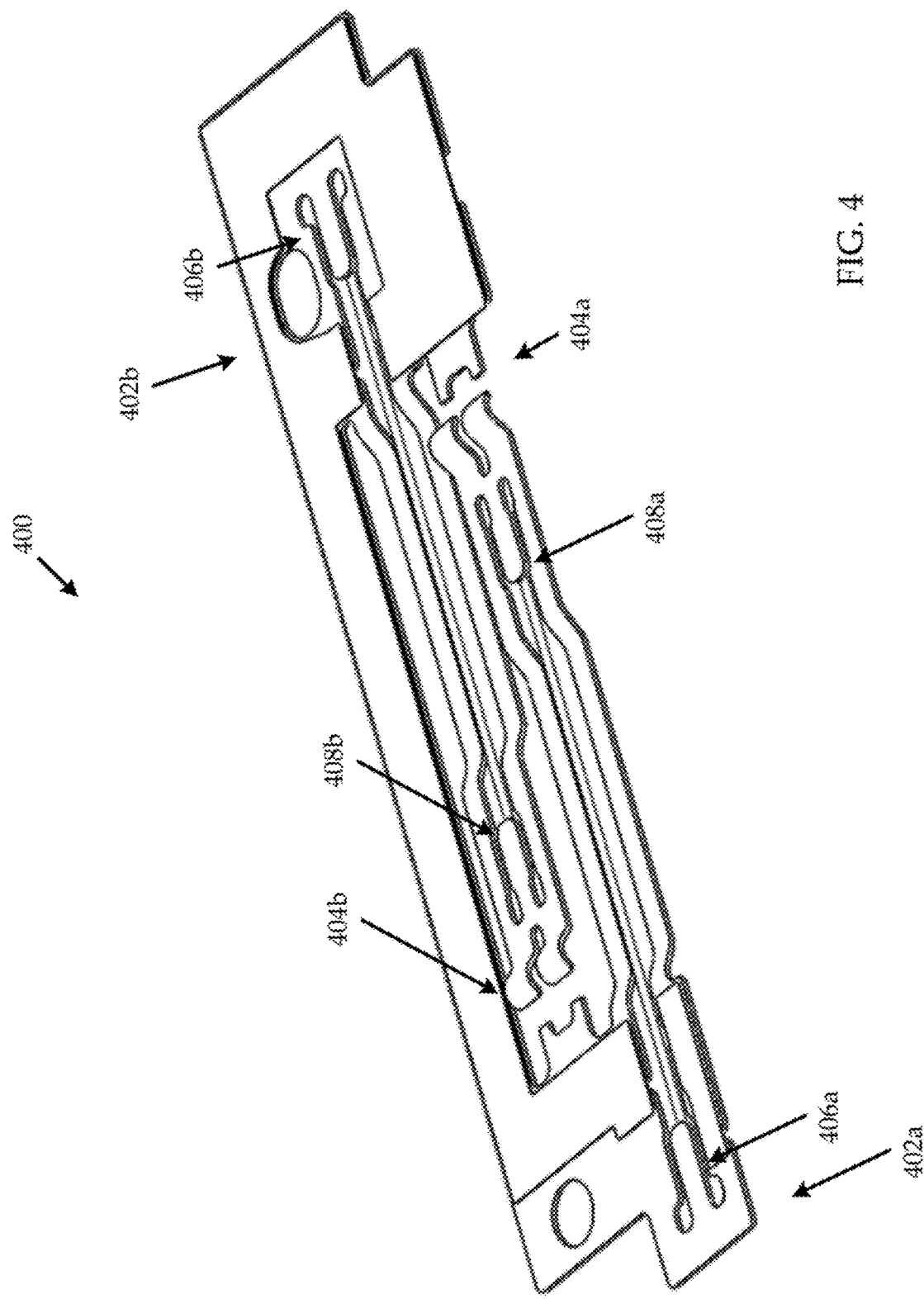
FIG. 4 illustrates a second example SMA actuator according to an embodiment.

FIG. 4 illustrates a second example SMA actuator 400. As shown in FIG. 4, the SMA actuator can include multiple actuators, each with independent fixed ends and free ends. For example, a first actuator can include a first fixed end 402a and a first free end 404a. Further, a second actuator can include a second fixed end 402b and a second free end 404b. The actuators can be directed opposing one another.

Further, each actuator can include weld tongue comprising a portion of the actuator in which the SMA wires are affixed. For example, a first weld joint 406a can be disposed at the first fixed end 402a, and a second weld joint 408a can be disposed at a first free end 404a. Similarly, a third weld joint 406b can be disposed at the second fixed end 402b, and a fourth weld joint 408b can be disposed at a second free end 404b.

Figure 5:
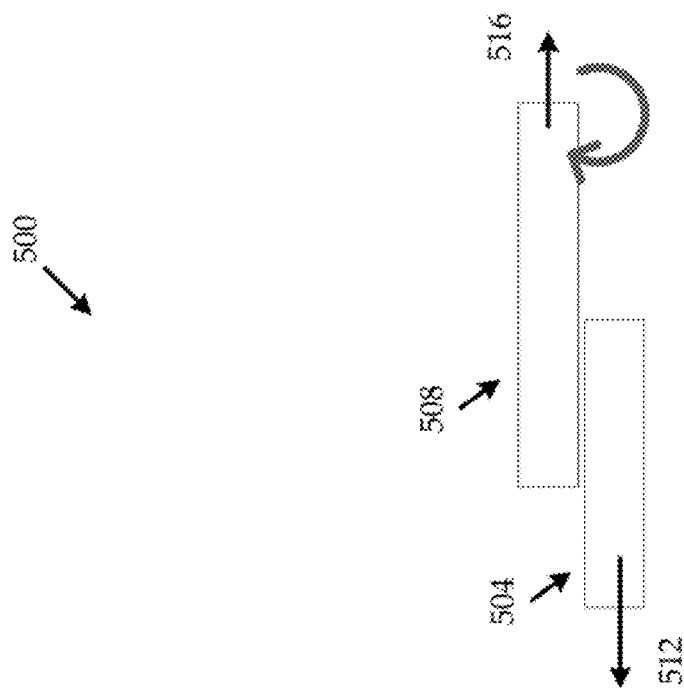
FIG. 5 illustrates an example of the force coupling between the wire and the weld tongue according to an embodiment.
Figure 5:
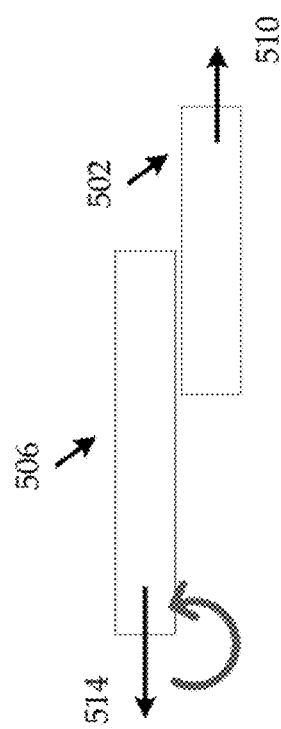

Favorable force coupling between the wire and compliant weld tongue is generated when the wire is welded on the opposite (bottom) surface of the SSt. This can result in a reduction in a wire exit angle at a large stroke. FIG. 5 illustrates an example of the force coupling between the wire and the weld tongue. For example, as shown in FIG. 5, a SMA wire can include a first end 502 and a second end 504. The first end 502 can be affixed (e.g., welded, soldered) to the fixed end 506. Further, the second end 504 can be affixed to the free end 508.

As shown in FIG. 5, force directions of the SMA wire and the actuator can cause force coupling between the SMA wire and the actuator. For example, the first end of the wire can have a direction 510 facing the second end of the wire 504. Further, the second end of the wire 504 can include a direction 512 facing the first end 502. Similarly, the fixed end 506 can have a direction 514 rotating away from the SMA wire. Further, free end 508 can have a direction 516 rotating away from the SMA wire. The differing directions of force between the SMA wire can cause force coupling between the SMA wire and the actuator.

Figure 6A:
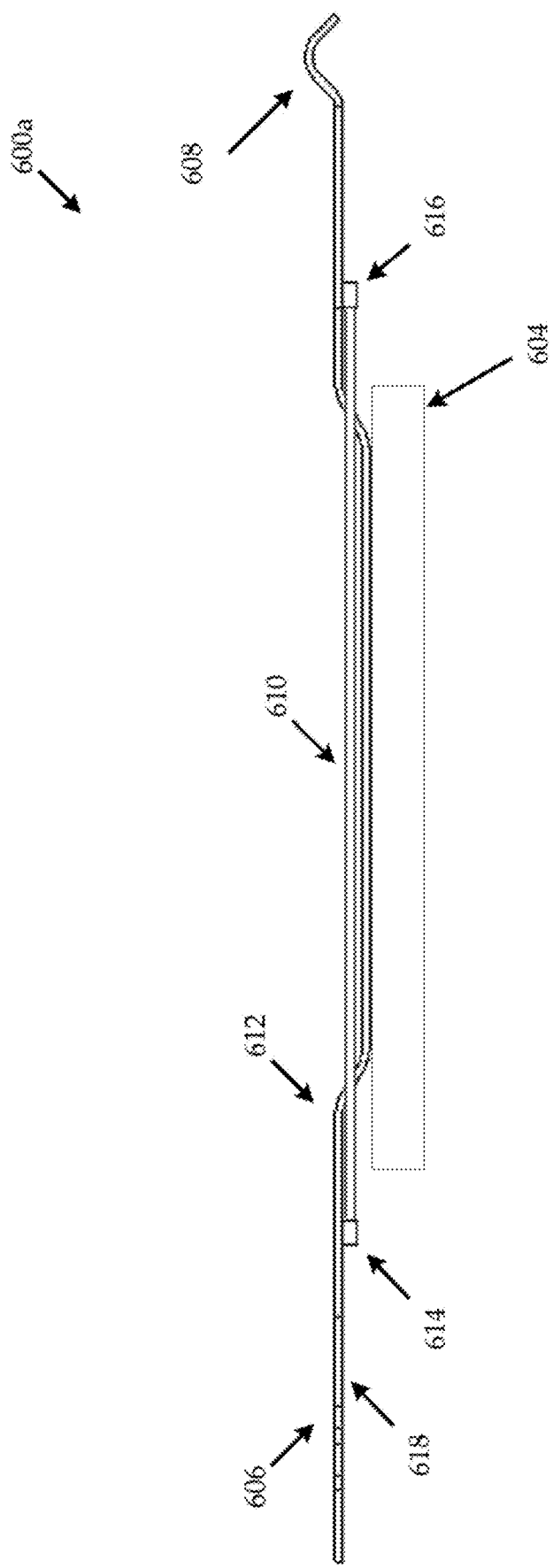
FIG. 6A illustrates a side view of an SMA actuator in a non-actuated position according to an embodiment.
Figure 6B:
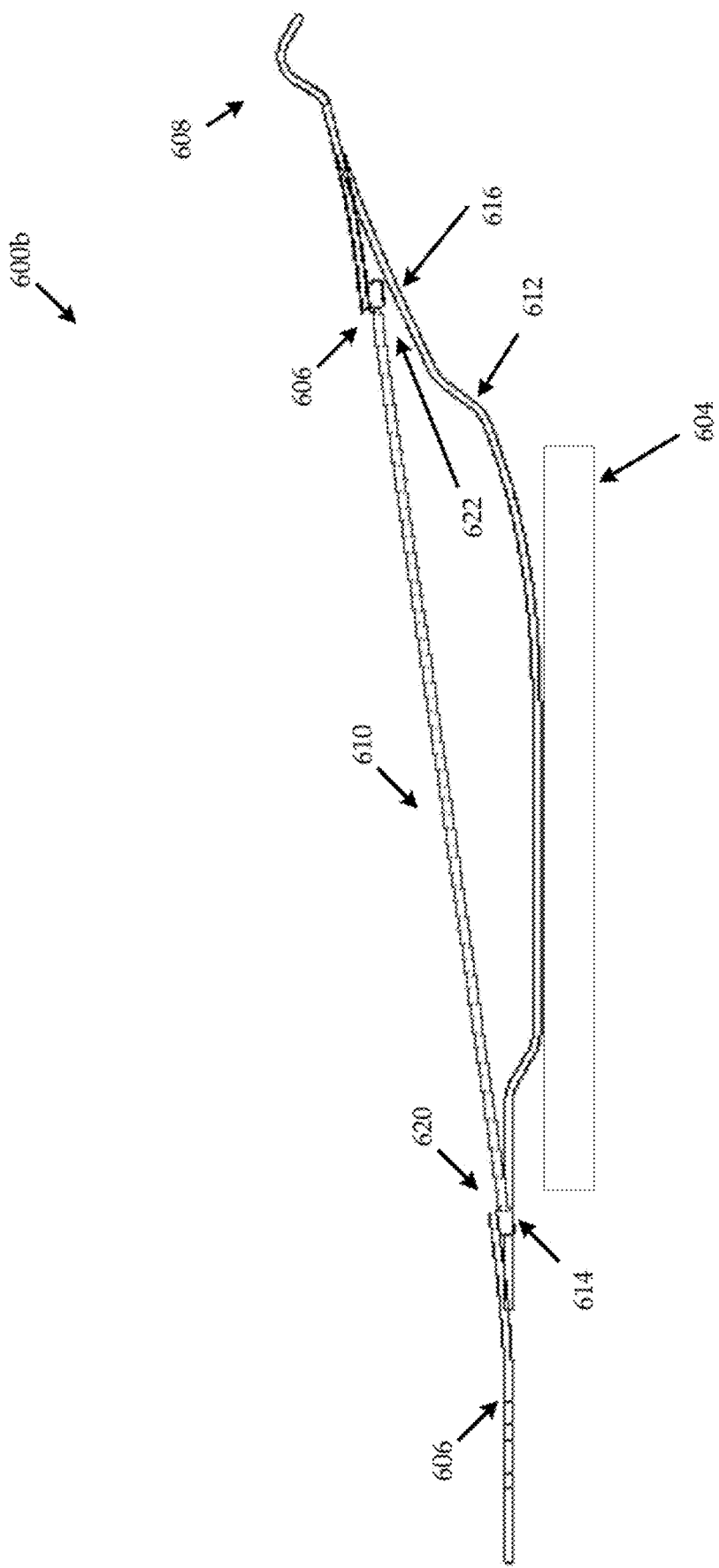
FIG. 6B illustrates a side view of the SMA actuator in an actuated position according to an embodiment.

FIGS. 6A-6B illustrate a side view of an example SMA actuator in both a non-actuated position (e.g., in FIG. 6A) and an actuated position (e.g., in FIG. 6B). As shown in FIG. 6A, the SMA actuator 600a can include a fixed end 606 and a free end 608, with a beam 612 disposed between the ends 606, 608. Further, an SMA wire 610 can be disposed between the fixed end 606 and the free end 608.

The SMA wire 610 can include a first end connected to the fixed end 606 at a first weld joint 614. Further, the second end of the SMA wire 610 can connect to free end 608 at a second weld joint 616. The ends of the SMA wire 610 can be affixed to the actuator (e.g., at weld joints 614, 616) at a bottom surface 618 of the actuator. The bottom surface 618 can include a surface of the actuator directed toward carriage 604. While only one SMA wire 610 is shown in FIG. 6A, two or more SMA wires can be disposed in the SMA actuator.

FIG. 6B illustrates a side view of the SMA actuator 600b in an actuated position. As shown in FIG. 6B, the SMA wire 610 can actuate in response to receiving an electrical current. The actuation of the SMA wire 610 can allow for the free end 608 to move in a positive z-direction. Further, the free end 608 can move in the z-direction responsive to an amount of electrical current provided to the SMA wire.

As shown in FIG. 6B, the beam 612 can be modified due to the actuation of the SMA wire 610. Further, an angle 620 between the fixed end 606 and the first weld joint 614 can be modified. Similarly, an angle specifying a difference between the free end 608 and the SMA wire 610 can be modified due to the actuation of the SMA wire 610.

As an example, a max stroke wire exit angle (e.g., angle 620) at the fixed end can be around 0 degrees with the weld joint 614 being disposed at the bottom surface of the actuator. In other actuators with the weld joint on a top surface of the actuator (e.g., as shown in FIG. 2), the angle between fixed end and the SMA wire can be upwards of 8 degrees. Similarly. A max stroke wire exit angle (e.g., angle 622) at the free end 608 can be around 2.2 degrees. In other actuators with the weld joint on a top surface of the actuator (e.g., as shown in FIG. 2), the angle between fixed end and the SMA wire can be upwards of 6.5 degrees. The reduction in wire exit angle can result in reduced bending of the SMA wire, which can reduce overall stress on the weld joints between the SMA wires and the actuator. This can also improve reliability of the near-weld wire. In some instances, the increased reliability of the SMA actuators as described herein can remove a requirement for additional process steps to increase resiliency, such as an adhesive addition process (e.g., as described with respect to FIG. 2).

In a first example embodiment, a shape memory alloy (SMA) actuator is provided. The SMA actuator (e.g., 300 in FIG. 3) can include at least one fixed end (e.g., 306) configured to be fixed to a carriage (e.g., 104 in FIG. 1) and at least one free end (e.g., 308). The SMA actuator can also include at least one beam (e.g., 320) connecting the fixed end (e.g., 306) and the free end (e.g., 308).

The SMA actuator can also include at least one SMA wire (e.g., SMA wires 310a-b). Each of the at least one SMA wire can be electrically connected to the at least one fixed end and the at least one free end via electrical contact portions (e.g., 314a-b, 318a-b). The at least one SMA wire can be disposed to corresponding electrical contact portions at a bottom surface of the actuator (e.g., 618) comprising a surface directed at the carriage.

In some instances, the electrical contact portions comprise a first set of electrical contact portions (e.g., 314a-b) at the at least one fixed end (e.g., 306). A first end of each of the at least one SMA wire can be disposed at each of the first set of electrical contact portions. The electrical contact portions can also include a second set of electrical contact portions (e.g., 318a-b) at the at least one free end. A second end of each of the at least one SMA wire can be disposed at each of the second set of electrical contact portions.

In some embodiments, the SMA actuator can include a first fixed end (e.g., 402a) with a first electrical contact portion (e.g., 406a) connected to a first end of a first SMA wire (e.g., 408a), a first free end (e.g., 404a) with a second electrical contact portion (e.g., 408a) connected to a second end of the first SMA wire, and a first beam disposed between the first fixed end and first free end.

In some instances, the SMA actuator can include a balanced SMA actuator, such as the actuator 400 as described with respect to FIG. 4. The SMA actuator can include a second fixed end (e.g., 402b) with a third electrical contact portion (e.g., 406b) connected to a second end of a second SMA wire, a second free end (e.g., 404b) with a fourth electrical contact portion (e.g., 408b) connected to a second end of the second SMA wire, and a second beam disposed between the second fixed end and second free end. The first free end (e.g., 404a) can be directed in a direction opposing a direction of the second free end (e.g., 404b).

In some instances, responsive to obtaining an electrical current at the at least one SMA wire, the at least one free end is configured to move in a positive z-direction. Further, the actuator can include a wire exit angle (e.g., 620) comprising an angle between the at least one fixed end (e.g., 606) and the at least one SMA wire (e.g., 610) being less than 10 degrees (e.g., or between 0 and 2 degrees) upon actuation of the at least one SMA wire.

In some instances, the SMA actuator can be part of an autofocus system for a camera.

In another example embodiment, a device is provided. The device can include a carriage and an actuator engaged to the carriage. The actuator can include a fixed end fixed to the carriage, a free end, a beam connecting the fixed end and the free end, and at least one shape memory alloy (SMA) wire. The at least one SMA wire can be electrically connected to the fixed end and the free end via electrical contact portions. The at least one SMA wire can be disposed to the electrical contact portions at a bottom surface of the electrical contact portions directed at the carriage.

In some instances, the electrical contact portions comprise a first set of electrical contact portions at the at least one fixed end. A first end of the at least one SMA wire can be disposed at the first set of electrical contact portions. The electrical contact portions can also include a second set of electrical contact portions at the at least one free end. A second end of the at least one SMA wire can be disposed at the second set of electrical contact portions.

In some instances, the actuator can include a first fixed end with a first electrical contact portion connected to a first end of a first SMA wire, a first free end with a second electrical contact portion connected to a second end of the first SMA wire, and a first beam disposed between the first fixed end and first free end. In some instances, the actuator can include a second fixed end with a third electrical contact portion connected to a second end of a second SMA wire, a second free end with a fourth electrical contact portion connected to a second end of the second SMA wire, and a second beam disposed between the second fixed end and second free end. In some instances, the first free end is directed in a direction opposing a direction of the second free end.

In some instances, a wire exit angle comprising an angle between the fixed end and each of the at least one SMA wire or an angle between the free end and the at least one SMA wire is less than 5 degrees upon actuation of each of the at least one SMA wire.

In another example embodiment, a system is provided. The system can include a first actuator portion. The first actuator portion can include a first fixed end, a first free end, and a first SMA wire. The first SMA wire can include a first end welded to a bottom surface of the actuator at the first fixed end and a second end welded to the bottom surface of the actuator at the first free end. The system can also include a second actuator portion. The second actuator portion can include a second fixed end, a second free end, and a second SMA wire. The second SMA wire can comprise a first end welded to the bottom surface of the actuator at the second fixed end and a second end welded to the bottom surface of the actuator at the second free end.

In some instances, the system can include a carriage. The first fixed end and the second fixed end can be fixed to the carriage. Further, the bottom surface of the actuator comprises a surface of the actuator directed toward the carriage.

In some instances, a direction of the first actuator portion opposes a direction of the second actuator portion. In some instances, any of the first free end and the second free end are configured to move in a positive z-direction. In some instances, the system is part of an autofocus system or an optical image stabilization system. In some instances, a wire exit angle comprising an angle between the first fixed end and the first SMA wire or an angle between the first free end and the first SMA wire is between 0 and 2 degrees upon actuation of each of the first SMA wire.

Figure 7:
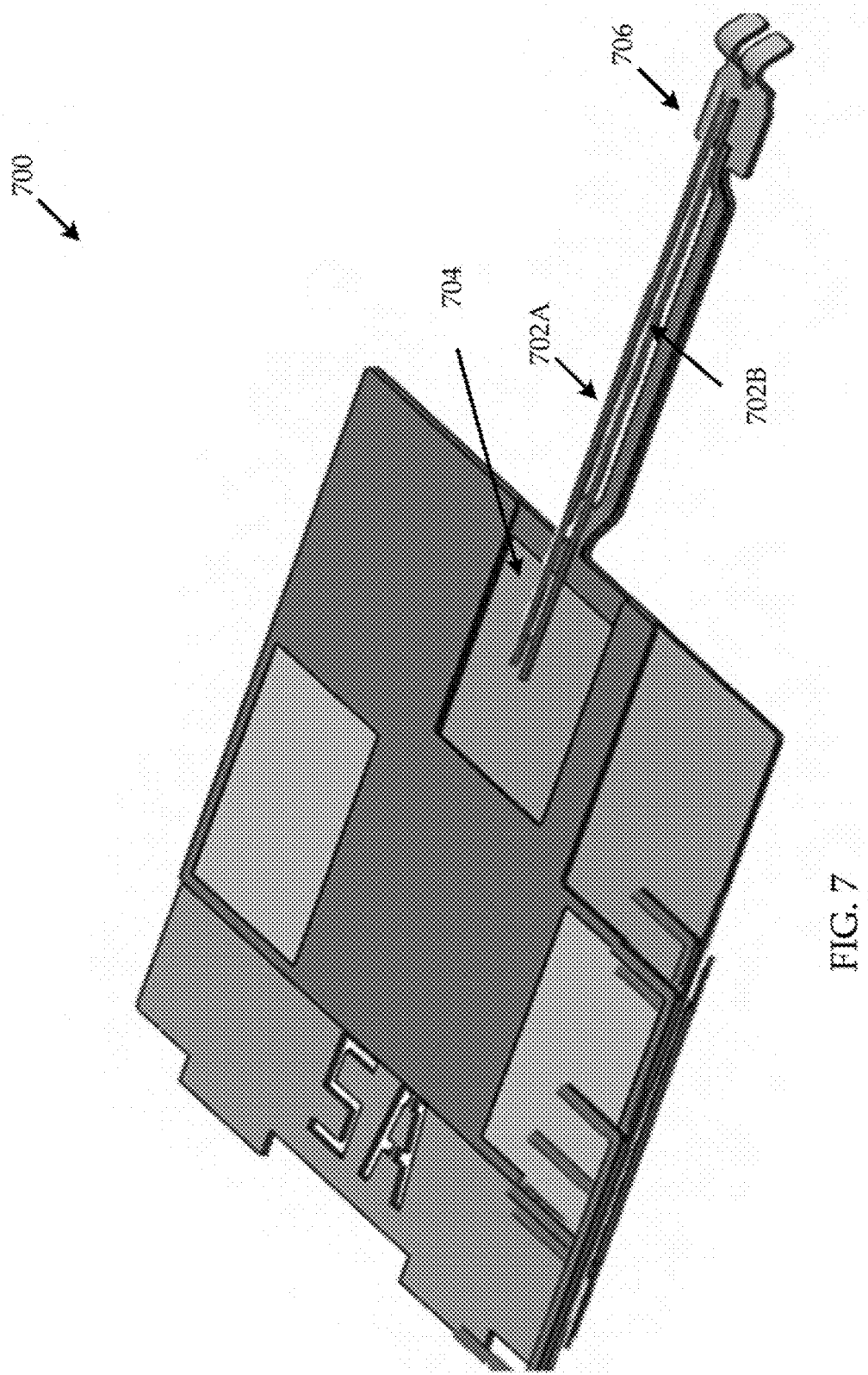
FIG. 7 is an illustration of an example actuator with multiple SMA wires according to an embodiment.

In some embodiments, an actuator can include multiple SMA elements (e.g., wires) connected from a base to a load point of the actuator. FIG. 7 is an illustration of an example actuator 700 with multiple SMA wires 702A-B. As shown in FIG. 7, the actuator 700 can include multiple SMA wires 702A-B. The wires 702A-B can be connected at a first end to an electrical circuit 704 at the base (or fixed end) of the actuator 700. A second end of the wires 702A-B can be affixed to an electrical circuit at a load point 706 (or unfixed end). The SMA wires 702A-B can be configured to receive a current and move the load point end 706 as described herein. The SMA wires 702A-B can each be connected to the electrical circuit 704 such that a current is delivered to each SMA wire 702A-B. In some instances, each SMA wire can be electrically isolated from one another.

Figure 8:
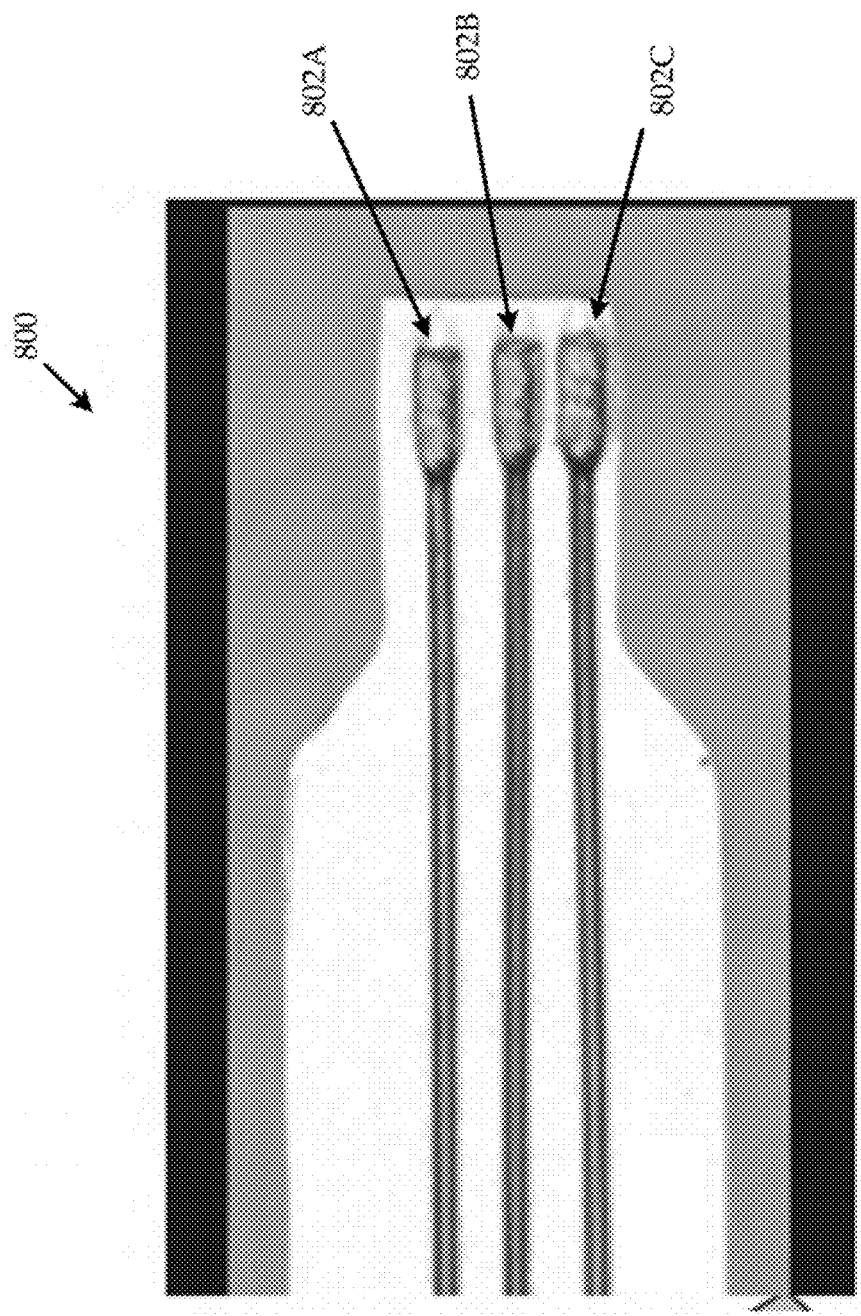
FIG. 8 illustrates a set of SMA wires affixed at an electrical circuit according to an embodiment.

FIG. 8 illustrates a set of SMA wires 802A-C affixed at an electrical circuit. As shown in FIG. 8, the ends of the SMA wires 802A-C can be affixed to an electrical circuit such that each wire is part of the same circuit. The wires 802A-C can be affixed using any of a variety of techniques, such as using an adhesive, soldering, resistance welding, etc. While three wires 802A-C are shown in FIG. 8, any suitable number of wires can be added to an actuator as described herein.

In an example embodiment, a SMA actuator is provided. The SMA wire can include a fixed end configured to be fixed to a carriage, a free end, and a beam connecting the fixed end and the free end. The SMA actuator can also include at least two SMA wires. The at least two SMA wires can be electrically connected to the at least one fixed end and the at least one free end via electrical contact portions. In some instances, each of the at least two SMA wires are connected to a same electrical circuit at any of the fixed and the free end.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A shape memory alloy (SMA) actuator comprising:
   a first actuator arm comprising:
      a first fixed end configured to be fixed to a base;
      a first free end;
      a first beam connecting the first fixed end and the first free end, wherein the first beam comprises a first side and a second side; and
      a first SMA wire electrically connected to the first fixed end and the first free end at the second side of the beam comprising a side configured to be directed toward the base; and
   a second actuator arm comprising:
      a second fixed end configured to be fixed to the base;
      a second free end;
      a second beam connecting the second fixed end and the second free end, wherein the second beam comprises a first side and a second side; and
      a second SMA wire electrically connected to the second fixed end and the second free end at the second side of the second beam.

2. The SMA actuator of claim 1, wherein the fixed end is configured to be fixed to a carriage, wherein the second side of the actuator comprises a surface directed toward the carriage.

3. The SMA actuator of claim 1, further comprising:
   a first electrical contact portion;
   a second electrical contact portion, wherein the first SMA wire is electrically connected to the first fixed end at the first electrical contact portion and the first free end at the second electrical contact portion
   a third electrical contact portion; and
   a fourth electrical contact portion, wherein the second SMA wire is electrically connected to the second fixed end at the third electrical contact portion and the second free end at the fourth electrical contact portion.

4. The SMA actuator of claim 3, wherein the first beam comprises two parallel beam portions with an opening formed between the two parallel beam portions, and wherein the first electrical contact portion and the second electrical contact portion extend into the opening formed between the two parallel beam portions.

5. The SMA actuator of claim 1, further comprising:
   a first set of electrical contact portions extending from the first fixed end; and
   a second set of electrical contact portions extending from the first free end.

6. The SMA actuator of claim 1, wherein the second free end of the second SMA actuator is directed in a direction opposing a direction of the first free end of the first SMA actuator.

7. The SMA actuator of claim 1, wherein, responsive to obtaining an electrical current at the first SMA wire or the second SMA wire, the first free end or the second free end is configured to move in a positive z-direction.

8. The SMA actuator of claim 1, wherein a wire exit angle comprising an angle between the first fixed end and the first SMA wire or between the second fixed end and the second SMA wire is less than 10 degrees upon actuation of each of the first SMA wire or the second SMA wire.

9. The SMA actuator of claim 1, wherein the SMA actuator is part of an autofocus system or an optical image stabilization system for a camera.

10. A device comprising:
    a carriage;
    an actuator engaged to the carriage, the actuator comprising a first side and a second side, with the second side facing the carriage, the actuator including:
       a fixed end fixed to the carriage, wherein a first set of electrical contact portions extend from the fixed end;
       a free end, wherein a second set of electrical contact portions extend from the free end;
       a beam connecting the fixed end and the free end; and
       two shape memory alloy (SMA) wires electrically connected to the fixed end and the free end at the second side of the actuator, with a first end of each of the two SMA wires connecting to each of the first set of electrical contact portions and a second end of the two SMA wires connecting to each of the second set of electrical contact portions.

11. The device of claim 10, further comprising:
    a second SMA actuator including:
       a fixed end connected to the carriage with an electrical contact portion connected to a first end of a second SMA wire;
       a free end with an electrical contact portion connected to a second end of the second SMA wire; and
       a second beam disposed between the fixed end and the free end of the second SMA actuator.

12. The device of claim 11, wherein the free end of the second SMA actuator is directed in a direction opposing a direction of the free end of the SMA actuator.

13. The device of claim 10, wherein a wire exit angle comprising an angle between the fixed end and each of the at least one SMA wire or an angle between the free end and the at least one SMA wire is less than 10 degrees upon actuation of each of the at least one SMA wire.

14. A method comprising:
    providing an actuator comprising a first side and a second side comprising a side configured to be directed toward a base, the actuator comprising:
       a first actuator arm including:
          a first fixed end configured to be fixed to a base, wherein a first electrical contact portion extends from the first fixed end;
          a first free end, wherein a second electrical contact portion extends from the first free end; and
          a first beam connecting the first fixed end and the first free end; and
       a second actuator arm comprising:
          a second fixed end configured to be fixed to the base;
          a second free end;

a second beam connecting the second fixed end and the second free end, wherein the second beam comprises a first side and a second side; and disposing a first shape memory alloy (SMA) wire to the second side of the actuator via the first electrical contact portion and the second electrical contact portion and a second SMA wire to the second fixed end and the second free end of the second beam.

15. The method of claim 14, wherein the SMA wire is disposed to the second side of the actuator via any of a weld joint and/or an adhesive at the first electrical contact portion and the second electrical contact portion.

16. The method of claim 14, further comprising:
disposing the actuator to a carriage, wherein the first fixed end and the second fixed end are fixed to the carriage, and wherein the second side of the actuator comprises a surface directed toward the carriage.

17. The method of claim 14, wherein, responsive to a current applied to the SMA wire, the free end is configured to move in a positive z-direction.

18. The method of claim 14, further comprising:
disposing a second SMA wire to the second side of the actuator via another electrical contact portion at the fixed end and another electrical contact portion at the free end.

* * * * *